Sept. 19, 1961 P. EALET 3,000,411
MACHINE FOR CUTTING UP WOOD, ESPECIALLY SAWMILL SCRAPS
Filed April 18, 1960 10 Sheets-Sheet 2

Inventor
PIERRE EALET
By Holcombe, Wetherill + Brisebois
Attorneys

Inventor
PIERRE EALET
Attorneys

Sept. 19, 1961 P. EALET 3,000,411
MACHINE FOR CUTTING UP WOOD, ESPECIALLY SAWMILL SCRAPS
Filed April 18, 1960 10 Sheets-Sheet 5

Inventor
PIERRE EALET
By Holcombe, Wetherill & Brisebois
Attorneys

Sept. 19, 1961 P. EALET 3,000,411
MACHINE FOR CUTTING UP WOOD, ESPECIALLY SAWMILL SCRAPS
Filed April 18, 1960 10 Sheets-Sheet 6

Inventor
PIERRE EALET
By Holcombe, Wetherill — Brueboi s
Attorneys

Inventor
PIERRE EALET

Sept. 19, 1961　　　　　P. EALET　　　　　3,000,411
MACHINE FOR CUTTING UP WOOD, ESPECIALLY SAWMILL SCRAPS
Filed April 18, 1960　　　　　　　　　　　　　　10 Sheets-Sheet 9

Inventor
PIERRE EALET
By Holcombe, Wetherill — Brisebois
Attorneys

Sept. 19, 1961 P. EALET 3,000,411
MACHINE FOR CUTTING UP WOOD, ESPECIALLY SAWMILL SCRAPS
Filed April 18, 1960 10 Sheets-Sheet 10
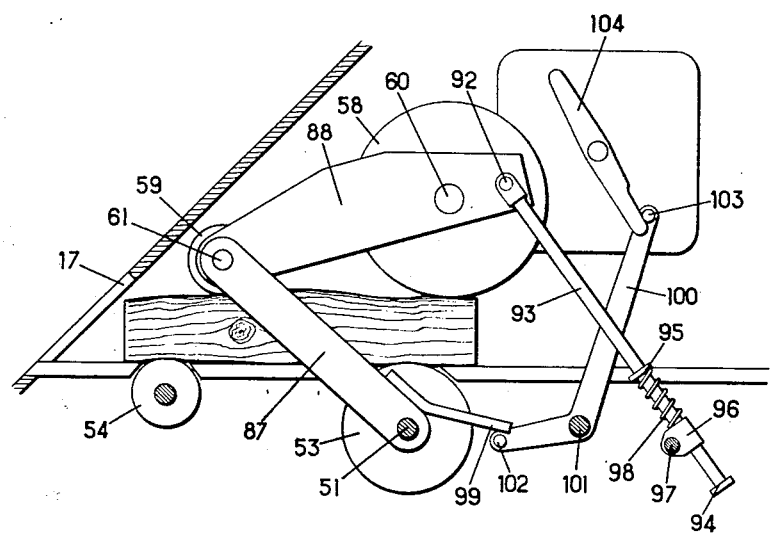
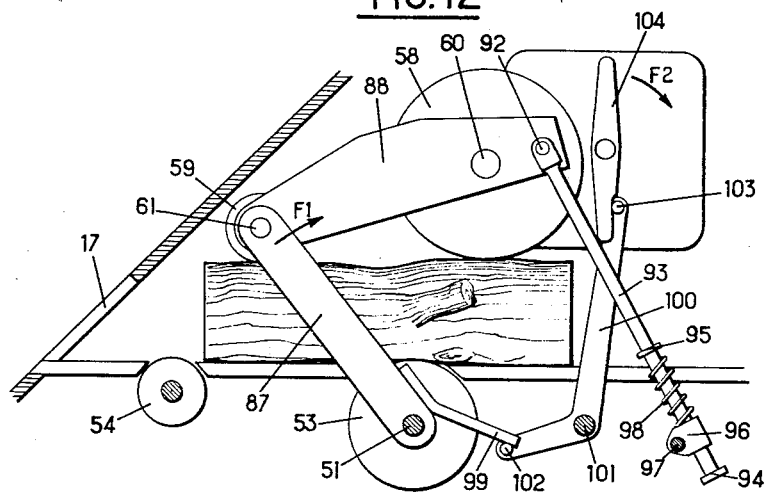
Inventor
PIERRE EALET
By Holcombe, Wardville & Busebois
Attorneys United States Patent Office 3,000,411
Patented Sept. 19, 1961

3,000,411
MACHINE FOR CUTTING UP WOOD, ESPECIALLY SAWMILL SCRAPS
Pierre Ealet, Charleville, France, assignor to Societe Anonyme dite: Etablissements Gustin Fils, Deville, France, a corporation of France
Filed Apr. 18, 1960, Ser. No. 22,921
Claims priority, application France Apr. 28, 1959
10 Claims. (Cl. 144—176)

The present invention relates to a new article of manufacture consisting of a machine for cutting the scrap lumber produced by sawmills into small pieces, while severing them at such an angle as to avoid crushing their fibers. The machine may be used on end scraps and trimmings, and the small bits into which they are cut are especially useful in the manufacture of paper and pressed wood panels.

In a general way this machine is characterized by the fact that it comprises, within a fixed housing, a cutting device comprising a rotating member which is inclined with respect to the plane in which scrap lumber to be cut up is fed into the machine, this rotary member being provided with removable readily accessible cutting blades and driven in rotation by a suitable motor, said blades being so arranged that as rapidly as they cut up the scraps, they expel the resulting bits into a delivery pipe which may lead directly to a wagon, a silo or any other recipient which may be filled without having recourse to a motor or to an auxiliary fan.

In such a machine, scraps are fed to the cutting drum which cuts up the trimmings or other pieces of wood by means of a preferably horizontal conveyor belt, the driving means for which is incorporated into the housing of the machine. The advance of the scraps through the cutting means is brought about by means of pairs of two superposed grooved feed rolls or driving cylinders, the shafts of the lower cylinders turning in bearings fixed on the frame of the machine, whereas the upper cylinders are mounted on their shafts by means of universal joints, the ends of these shafts being mounted on a movable support carried by two arms which are pivotally mounted on a shaft carried by a fixed mounting in the frame of the machine. This arrangement permits the upper driving cylinders to move vertically, independently of each other, and incline themselves transversely with respect to the direction of feed, thus permitting them to secure a good grip on and properly advance the scraps to be cut, regardless of their shape and size.

In accordance with another characteristic of the invention, the cylinders advancing the scraps to be cut up and the driving means for the conveyor belt are driven through a clutch which may be remotely controlled. Thanks to this arrangement, it is possible, without having to stop the cutting head to reverse both the direction of the aforesaid grooved cylinders and the direction of travel of the conveyor belt, thus permitting the bits of wood to be moved backward and removed from the machine, in case of jamming.

Such a clutch may be combined with an audible, or optical warning signal, or the like.

In a preferred embodiment of the machine constituting the invention, a connecting rod is pivotally mounted on the ends of the arms supporting the upper driving cylinder of the feeding means, each connecting rod carrying two stops, one at its lower end and one at a predetermined point along its length, these stops being positioned on opposite sides of a socket spaced from one of them by shock absorbing means.

This arrangement provides:

a. A limitation of the upward movement of the upper feed roll, so that the latter cannot fly out of the housing of the machine when it is raised by the passage of a piece of wood which is thicker than the pieces normally admitted;

b. A lifting of the intermediate feed roll, mounted at the lower end of the arms supporting the said upper feed roll, which facilitates the feeding;

c. A cushioning of the fall of the upper and intermediate feed rolls after a piece of wood has passed under them.

In order to make the operation of the machine completely safe, one of the pivotally mounted arms supporting the feed rolls is so arranged that its actuates the control means for throwing the feed out of gear when the pivotal movement of the said arm exceeds a predetermined amplitude corresponding to the maximum thickness of the wood which is to be admitted to the machine.

For this purpose, one of the lower arms carrying the intermediate feed roll and pivotally mounted on the shaft of the lower feed roll is provided at its lower end with a projection cooperating with a pin fixed to a pivotally mounted bent lever, a pin which is engaged by said projection as an overly thick piece of wood passes under the upper feed roll, and pivots the bent lever, the upper end of which actuates the control means for releasing the clutch in the feed roll drive, thus avoiding jamming of the machine and damage to the cutting blades.

In order that the object of the invention may be better understood, two embodiments thereof will now be described, purely by way of example, without limiting the scope of the invention to the details thereof. These embodiments are illustrated in the accompanying drawings, on which:

FIG. 5a is a partial cross-section taken along the line Va—Va of FIG. 2;

FIG. 11 shows the passage under the smaller upper roll of the piece of wood shown in FIG. 10; and FIG. 12 shows the operation of the clutch of the feed means, during passage of an abnormally thick piece of wood under the upper rolls.

Figure 1:
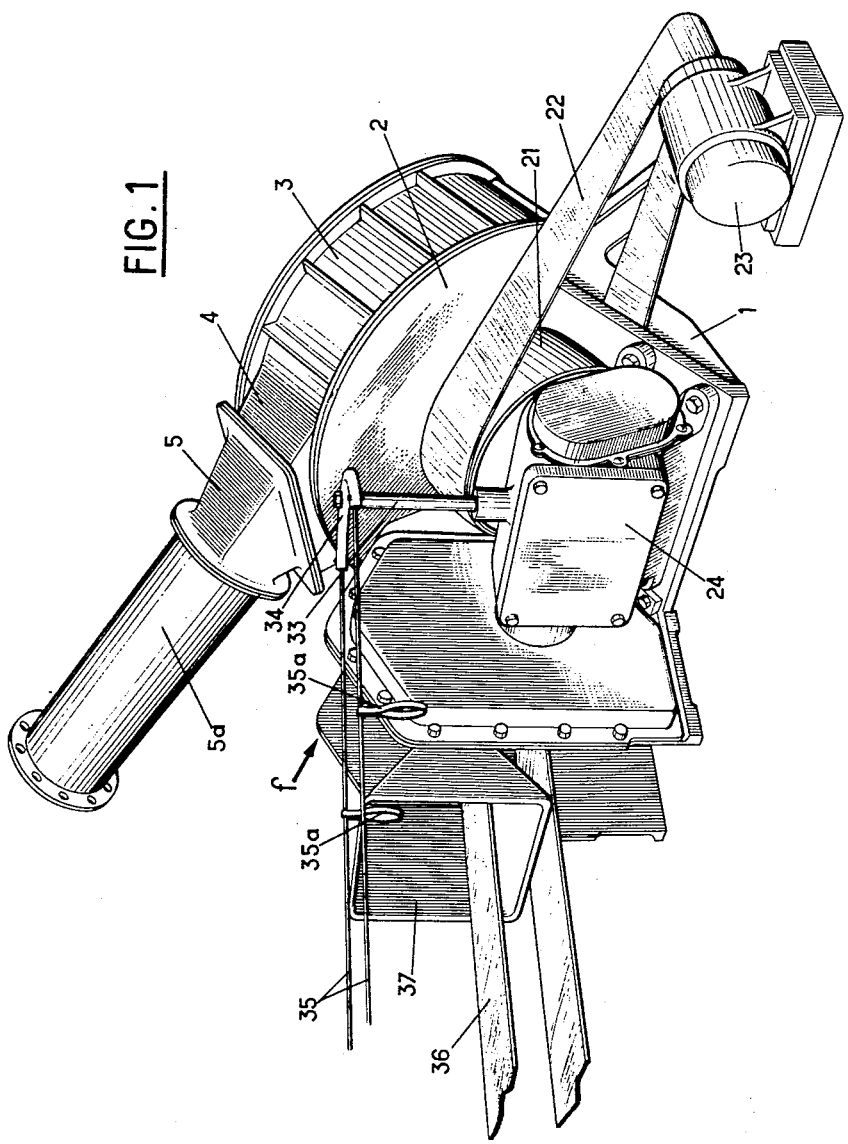
FIG. 1 is a perspective view showing one of these embodiments.

The embodiment shown on FIGS. 1-7 inclusive will now be described. Referring now to the drawings, it will be seen that reference numeral 1 indicates the base of the machine. This base carries an inclined end wall 2, fixed to a cylindrical drum 3 carrying a chute 4 provided with a spout 5 terminating in a tube 5a, the purpose of which will be explained later.

A rotating member or cutter head 6 is mounted in the drum 3 and keyed to a shaft 7 turning in a bearing 8 fixed to the bottom of the drum 3 and in a second bearing 9 carried by the base 1.

Two symmetrical ramps 10 and 10a, inclined in opposite directions, are provided on the lower surface of the rotary member 6 and carry at their ends two diametrically opposed adjustable blades 11 and 12 which may, after adjustment, be wedged in working position by means of blocks 13 and 14. These blades 11, 12, to which ready access may be had through an opening in the drum 3, acting in combination with two readily removable and replaceable members 15—16 (preferably of a highly wear resistant steel) define two openings 17 designed to admit ends of the pieces of wood to be cut.

The upper surface of the rotary member or cutter head 6 carries two paddles or plates 18 and 19 (FIGS. 3 and 4) reinforced by means of gussets 20, for example, these plates being designed to provide for the feeding through of the bits of cut-up wood and their expulsion through the chute 4 and spout 5 into the tube 5a which leads them to the loading or storage point.

The shaft 7 is driven at a predetermined speed by means of a pulley 21 driven by a motor 23 (FIG. 1) through a belt 22.

A clutch is mounted on the shaft 7 controlling the feed rolls for the scraps of wood and the conveyor belt, and permitting the direction in which they are driven to be reversed, if necessary, without having to stop the cutting wheel.

This clutch, which is mounted in a housing 24, comprises a conical gear 25 fixed to the end of the shaft 7. The gear 25 is in engagement with two symmetrical crown gears 26 and 27 mounted to freewheel on the shaft 28 which turns in bearings 29 carried by the housing 24, two independent friction clutches 30 and 31 being associated with these crown gears.

Figure 3:
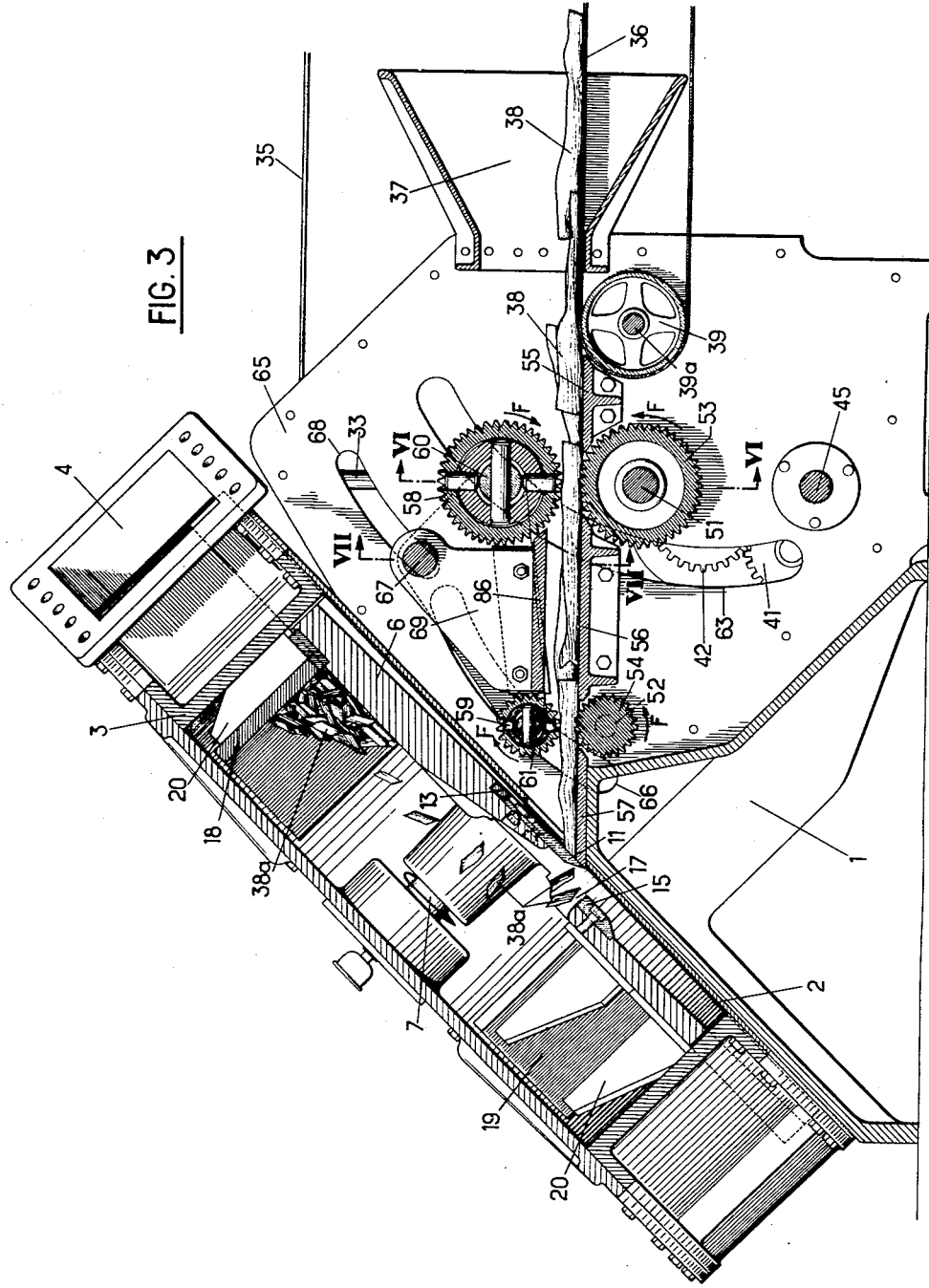
FIG. 3 is a vertical cross-section taken along the line III—III of FIG. 5.
Figure 4:
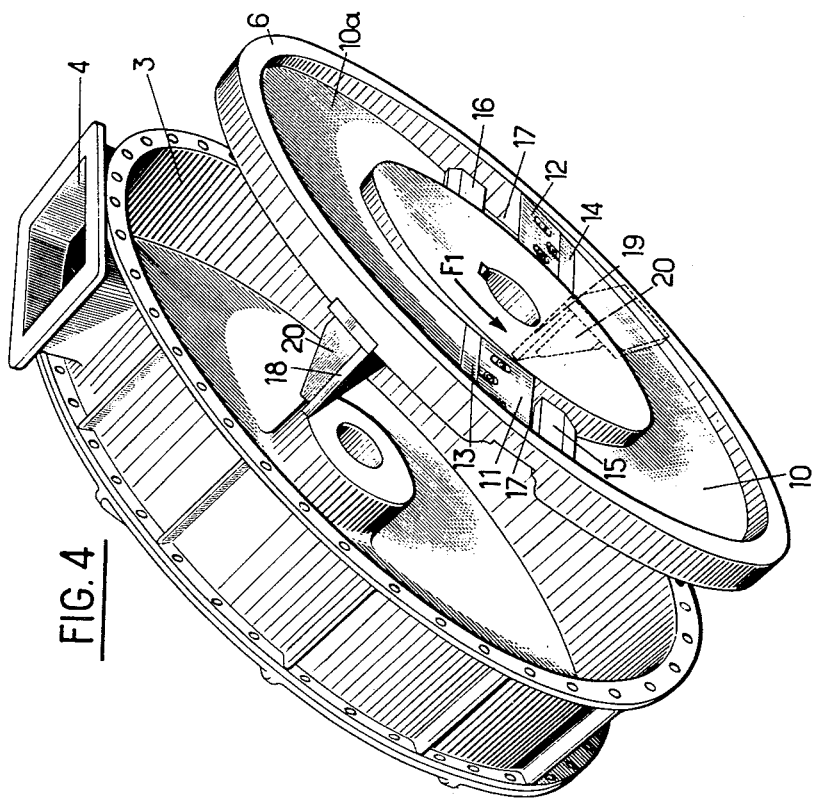
FIG. 4 is an exploded perspective view showing the cutting wheel and the drum within which it is mounted.
Figure 5:
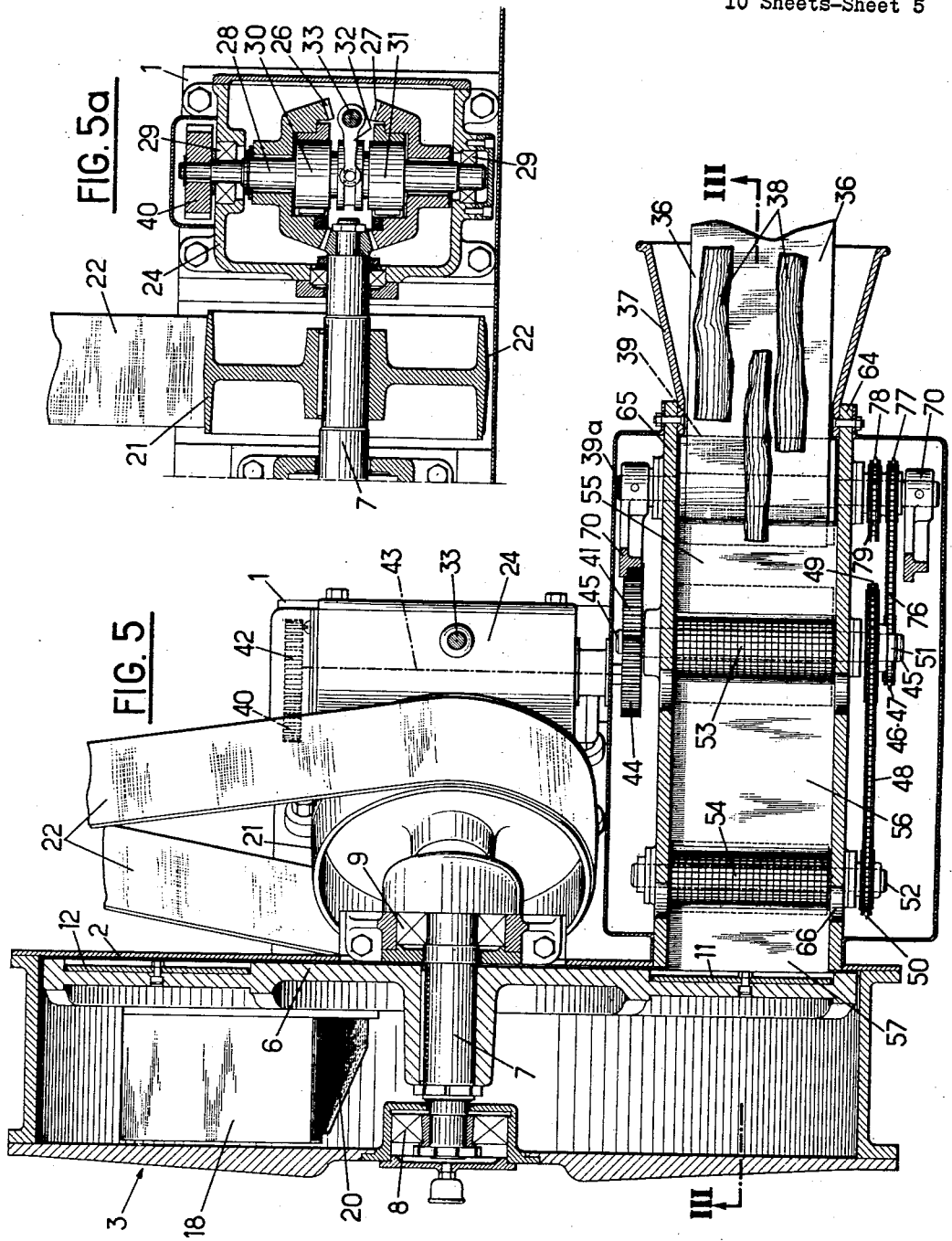
FIG. 5 is a cross-sectional view taken along the line V—V of FIG. 2.
Figure 6:
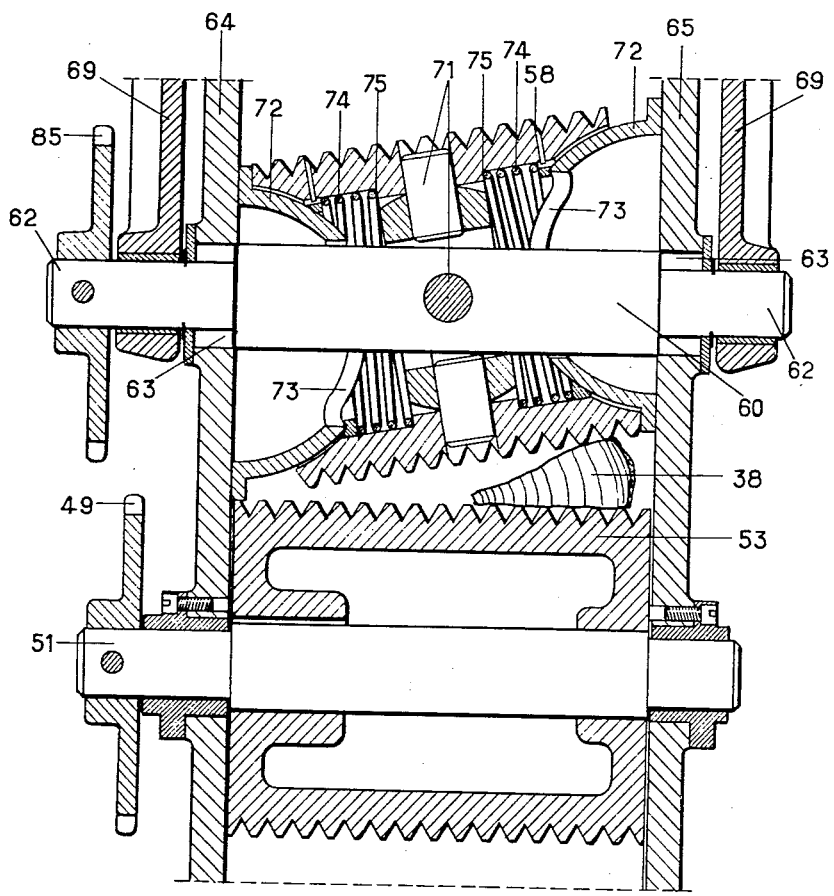
FIG. 6 is a cross-sectional view on an enlarged scale, taken along the line VI—VI of FIG. 3.
Figure 7:
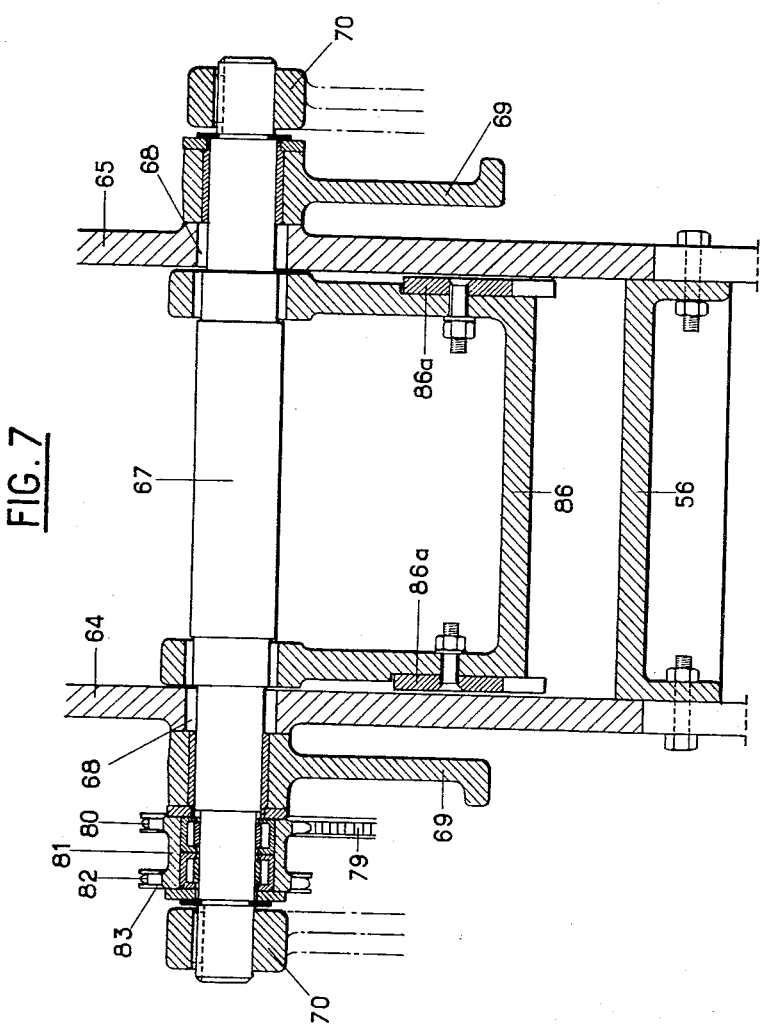
FIG. 7 is a cross-sectional view taken along the line VII—VII of FIG. 3.

The crown gears 26 and 27 may be clutched to the shaft 28 by means of a control comprising for example, a fork 32 which may be actuated from a distance through a lever 33 and arm 34 connected to cables 35 extending along and over an endless conveyor belt 36 which passes through a spout 37 fixed to the base 1. The belt 36 is driven by a roll 39 mounted on a shaft 39a near the grooved cylinders (FIG. 3). Handles 35a are mounted on the cables 35 to permit control of the clutches from any of a plurality of positions.

A gear 40 is fixed to the end of the shaft 28 and connected through appropriate gearing to a driven gear 41 mounted on a shaft 45, which in turn drives the feed means for the scraps of wood 38 which are to be cut up. This gear train comprises a gear wheel 42 engaging the gear wheel 40 and mounted on one end of a transmission shaft 43, which carries at its other end a gear wheel 44 in engagement with the said gear wheel 41.

The shaft 45 carries, in addition to the gear wheel 41, the gear wheels 46 and 47. The gear wheel 46 is connected through an endless chain 48 to two gear wheels 49 and 50 mounted on shafts 51 and 52 which turn in bearings fixed to the base 1. A grooved cylinder 53, of large diameter, is mounted on the shaft 51, while a grooved cylinder 54 of smaller diameter is mounted on the shaft 52.

A table 55 is mounted on the base 1, between the cylinders 39 and 53, substantially in alignment with the conveyor belt 36. A second table 56, also fixed to the base 1 and following the table 55, is positioned between the cylinder 53 and the cylinder 54, this table 56 being followed, beyond the said cylinder 54, by a plate 57, which is bevelled along its front edge, said edge being positioned in the plane of the rotary member 6 so as to cooperate with the blades 11 and 12 thereon.

Two additional grooved cylinders 58—59 cooperate with the grooved cylinders 53—54, over which they are superposed. The grooved cylinder 58 is mounted on a shaft 60 (FIGS. 2, 3, 6 and 8), the ends 62 of which pass through arcuate openings 63 in the two end walls 64, and 65 mounted on the base 1.

The cylinder 59 is carried by a shaft 61 mounted in the same way as the cylinder 58 on the shaft 60, that is to say, with its ends passing through two arcuate openings 66 (FIGS. 2 and 3) in the aforesaid end walls 64 and 65.

The end walls 64 and 65 are provided with arcuate openings 68 (FIGS. 2 and 3) in which the ends of a shaft 67 are slidably positioned. Two triangular guards are mounted at their corners on the ends of the shaft 67. The shafts 60 and 61 of the grooved cylinders 58 and 59 are mounted in two corners of the guards 69 opposite to the corners carrying the shaft 67.

Two arms 70 are keyed to the ends of the shaft 67, their lower ends being fixed to the end of the shaft 39a of the roll 39 which drives the conveyor belt 36.

The cylinder 58 is mounted on its shaft 60 by means of a universal joint 71 (FIG. 6) and hemispheres 72 pierced by orifices 73 in which said shaft 60 is free to turn. Springs 74 are interposed between the hemispheres 72 and circular stops 75 inside the cylinder 58.

The cylinder 59 is mounted on its own shaft 61 in the same manner as the cylinder 58 on its shaft 60, and since the two arrangements are identical, it has not been considered necessary to show the latter in detail.

A protective device 86 provided with friction means 86a is pivotally mounted on the shaft 67 between the end walls 64 and 65 and the cylinders 58 and 59.

Figure 2:
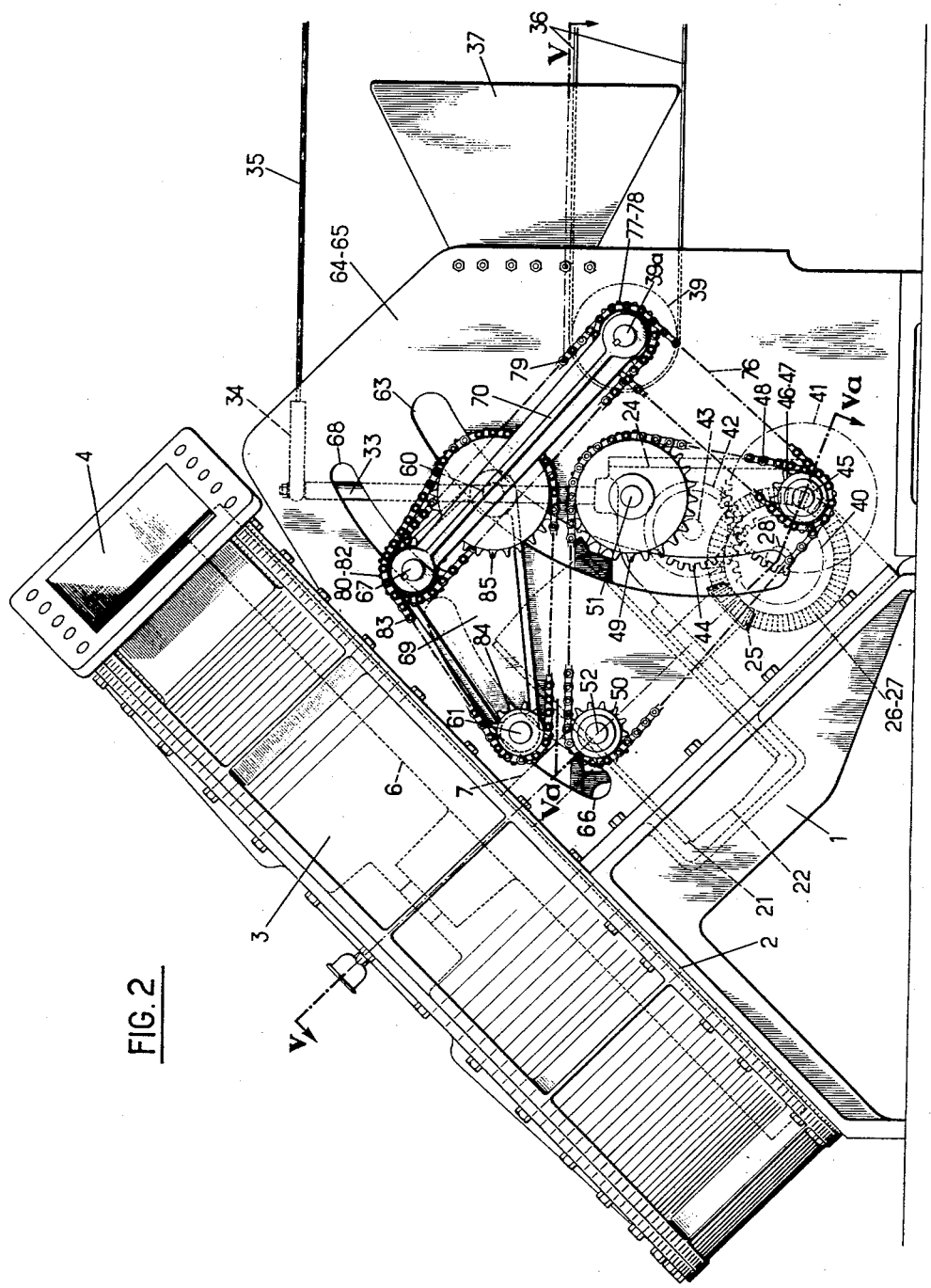
FIG. 2 is an elevational view on a larger scale, showing the device of FIG. 1, looking in the direction of the arrow f, with the housing which protects the control means for the feed rolls for the conveyor belt removed.

The driving means hereinbefore described is controlled in the following manner:

The gear-wheel 47, keyed to the shaft 45, acting through an endless chain 76, drives a gear wheel 77 keyed to the shaft 39a of the cylinder 39 which drives the conveyor belt 36 (FIG. 2). A gear wheel 78 is also keyed to the shaft 39a and connected through a chain 79 to the teeth 80 of a double pinion having a second set of teeth 82 connected through the endless chain 83 to two other gear wheels 84 and 85 respectively, each fixed to one end of one of the shafts 60 and 61 respectively.

The kinematic train thus formed (between the gear wheel 25 and the shaft 7) transmits the movement of the motor 23 to the rotary cutter 6 and the four grooved cylinders 53—54 and 58—59, as well as to the cylinder 39 which drives the conveyor belt 36.

The machine hereinbefore described works in the following manner:

The motor 23 having been started, and the clutch having been engaged to drive the grooved cylinders in the direction of the arrows F, the conveyor belt is supplied with scraps 38. These scraps reach the first superposed cylinder 53 and 58, travelling at the desired speed, and are seized and advanced til they reach the cylinders 54 and 59, near the rotary member or cutter head 6 which turns in the direction of the arrow F1. When they reach the openings 17, the blades cut up the scraps 38 which enter the interior of the drum 3, from which the paddles 18, 19 expel the cut-up bits 38a through the chute 4, the spout 5 and the tube 5a.

It should be noted that by reason of the mounting of the upper cylinders 58 and 59, hereinbefore described, the scraps are properly fed regardless of their size (FIG. 3).

In the case of an operational error or jamming of the machine, the shaft 28 is released from crown gear 26 and engaged with crown gear 27 by means of the handles 35a fixed to the cables 35, thus reversing the direction of rotation of the cylinders and of the cylinder 39 which drives the conveyor belt. This reversal of direction permits the release of the scraps behind the cylinders 53 and 58.

Figure 8:
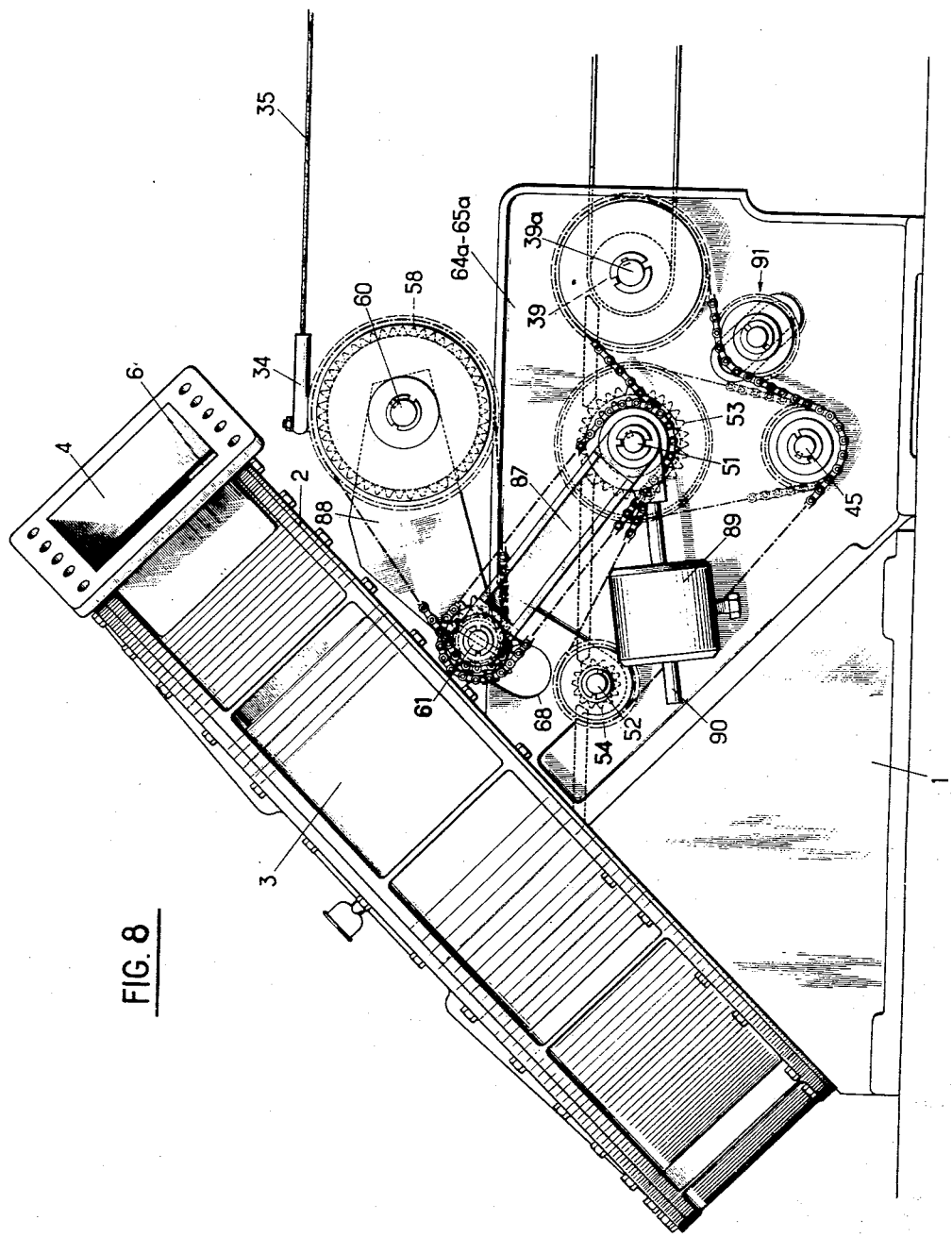
FIG. 8 is an elevational view showing an alternative embodiment of the control means for the grooved rollers which advance the scraps to be cut up.
Figure 9:
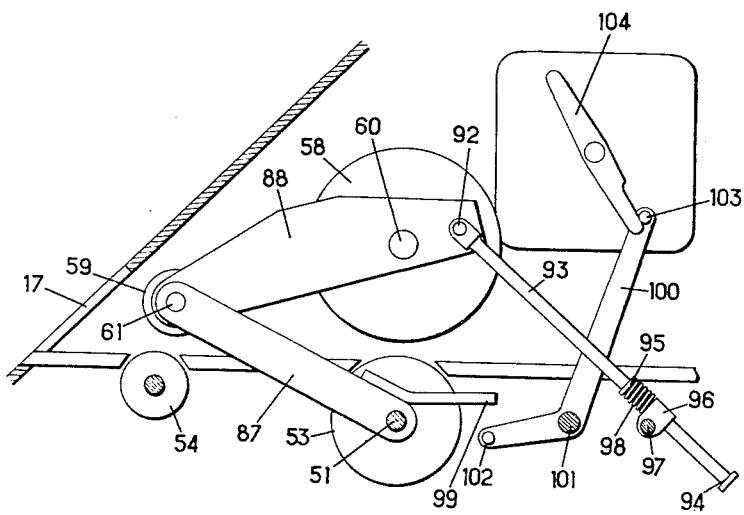
FIG. 9 is an elevational view, showing in non-operating position, a safety device for automatic cushioning and clutch release, with which the machine may be equipped.
Figure 10:
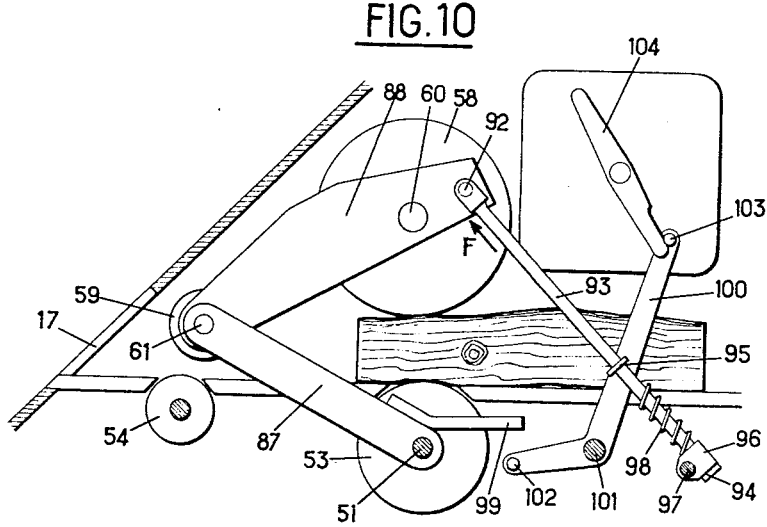
FIG. 10 shows the device of FIG. 1 in operating position during the passage of a piece of wood of normal thickness under the large upper roll.

In the alternative embodiment shown on FIG. 8, two symmetrical arms 87 are pivotally mounted, each by one of its ends, at the ends of the shaft 51 on opposite sides of the end walls 54a and 65a. Only one of these arms is shown on the drawing. The other end of each arm carries a shaft 61 like the shaft 61 of the embodiment of FIGS. 1 to 7.

Two symmetrical arms 88 are also mounted on the ends of the shaft 61, and carry at their free ends a shaft 60 like the shaft 60 previously mentioned.

The shafts 60 and 61 carry, respectively, a cylinder 58 and a cylinder 59 identical to the cylinders 58 and 59 of the first embodiment.

In this embodiment the arms 87 are fixed at their lower ends to a weight 89 slidably mounted on the arm 90. This weight permits the pressure of the upper cylinders 58 and 59 on the scraps 38 to be regulated at will.

Shafts 45, 39a, 51, 52, 60 and 61 carry gear wheels connected by means of chains which transmit the drive from the motor 23 to the cylinders 53—54, 58—59, and 39 in the same way as in the previously described embodiment. A take-up 91, or any similar device, permits the tension of all or part of the chains to be regulated at will.

As will be readily understood, the arms 87 and 88 serve as a mobile support for the upper cylinders and permit their vertical adjustment, the possibility of transverse pivoting being afforded by a universal joint mounting like that already described.

The embodiments hereinbefore described may be advantageously equipped with the devices shown on FIGS. 9, 10, 11 and 12.

Referring to these figures, they show the feed window 17 for the cutting device; the shaft 51 of the lower feed roll 53, and the upper feed rolls 58 and 59 mounted on their respective shafts 60 and 61, these shafts 51, 61 and 60 being connected by the arms 87 and 88.

A connecting rod 93 is pivotally mounted on a pin 92 on the upper end of the arm 88 and is provided with two fixed stops, one, 94, at its free end, and the other, 95, near its middle. The portion of the connecting rod between the two stops 94 and 95 is slidably mounted in a socket 96 which is pivotally mounted on a shaft 97 fixed to the base of the machine. This portion of the connecting rod carries a compression spring 98 bearing at its ends on the upper surface of the socket 96 and on the stop 95.

A projection 99 is carried by the lower end of one of the arms 87, and its free end cooperates with a pin 102 carried by the lower end of a bent lever 100 pivotally mounted on a shaft 101 carried by the base, the upper end of said bent lever being provided with a pin 103 normally bearing against the lower end of a clutch control arm 104.

The device just described works in the following manner:

Normally, the cylinders 58 and 59 are in their lowered position (FIG. 9), and so is the connecting rod 93, the stop 95 of which compresses the spring 98 against the socket 96.

During operation (FIG. 10) when the front part of a scrap of wood of normal thickness is gripped beneath the cylinder 58, the arm 88, to which the connecting rod 93 is pivoted, turns about the shaft 61, and lifts the connecting rod, in the direction of the arrow F until the stop 94 encounters the socket 96. At this moment, the arm 88 turns the arm 87 around its shaft 51, lifting the intermediate cylinder 59. This movement is completed by the direct action of the front end of the piece of wood when it encounters the said cylinder 59 (FIG. 11).

As soon as the piece of wood has passed beyond the feed rolls 58 and 59, and through the opening 17, it is completely engaged in the cutting drum, the feed rolls falling back under the influence of gravity into their initial positions, this fall being cushioned by the spring 98.

If, as shown on FIG. 12, a piece of wood which is small enough to pass between the feed rolls 58 and 59, but too thick to enter the cutting drum, is introduced into the machine, this piece of wood causes the arm 87 to turn in the direction of the arrow F1. The projection 99 on this arm encounters the member 102 and turns the lever 100 in the direction of the arrow F1.

Simultaneously, the member 103 turns the control arm 104 about its axis, in the direction of the arrow F2, thus releasing the clutch of the feed means.

The operator of the machine may then take the steps required at this time—a reversal of the direction of travel of the feed means, release of the pieces of wood where they are jammed, etc.

What is claimed is:

1. A machine for cutting scrap lumber into small bevelled bits comprising in combination a base, a drum fixed to said base, a rotary cutter within said drum, means carried by said cutter for expelling the small bits from the drum; feed means for supplying scrap lumber to said drum, means associated with said feed means for firmly gripping and advancing said scraps of lumber, regardless of their size and shape, means for driving said rotary cutter, said feed means and said gripping means, a clutch between said drive means and said gripping means and feed means which permits said gripping means and said feed means to be stopped without stopping said rotary cutter and the direction of travel of said feed means to be reversed, and means for automatically releasing said clutch when an oversize scrap enters said scrap gripping means.

2. A machine for cutting scrap lumber into small bevelled bits comprising in combination a base, at least one set of superposed feed rolls mounted on said base and positioned to feed scraps supplied thereto along a predetermined feed plane, a drum mounted on said base athwart said plane provided with an opening in the side facing said feed rolls at the level of said plane, a rotary cutter mounted in said drum to rotate in a plane transverse to said feed plane about an axis which is inclined with respect to said feed plane, and removable blades mounted on said cutter, the lower roll of each set of feed rolls being mounted on a shaft carried by stationary mountings on said base, whereas the upper rolls are mounted through universal joints on shafts carried on a mobile support comprising two arms mounted to pivot on said base, whereby said upper rolls may move vertically with respect to said lower rolls and angularly with respect to said plane.

3. A machine as claimed in claim 2 comprising a plurality of oppositely inclined symmetrical ramps on the surface of said cutter facing said feed rolls, means for adjustably mounting said blades at the ends of said ramps where they define one side of apertures for admitting the ends of said scraps to be cut, and paddles fixed to the opposite surface of said cutter for expelling the comminuted bits of wood from said drum.

4. A machine as claimed in claim 3 in which said scraps are fed to said rolls by an endless conveyor belt.

5. A machine for cutting scrap lumber into small bevelled bits comprising in combination a base, a plurality of parallel sets of superposed feed rolls mounted on said base the nips of which define a feed plane along which said scraps are fed by said rolls, a drum mounted on said base athwart said plans and provided with a scrap-admitting opening in the side thereof facing said feed rolls at the level of said feed plane, and a rotary cutter mounted in said drum for rotation in a plane transverse to said feed plane about an axis which is inclined with respect thereto, the lower feed roll of each set being mounted on a shaft carried by stationary mountings on said base, while the upper feed roll is mounted through universal joints on a shaft carried by a mobile support comprising two arms mounted to pivot on said base, whereby said upper rolls may move vertically with respect to said lower rolls and angularly with respect to said feed plane.

6. A machine as claimed in claim 5 comprising drive means for driving both said cutter and said feed rolls and clutch means between said drive means and feed rolls which may be released without affecting the driving of said cutter.

7. A machine as claimed in claim 6 comprising a member connected to be moved when said one of said upper feed rolls rises and a clutch actuator positioned in the path of travel of said member so as to be thrown when said upper feed roll rises a predetermined distance.

8. A machine for cutting scrap lumber into small bevelled bits comprising in combination a base, a plurality of parallel sets of superposed feed rolls mounted on said base the nips of which define a feed plane along which said scraps are fed by said rolls, a drum mounted on said base athwart said plane and provided with a scrap-admitting opening in the side thereof facing said feed rolls at the level of said feed plane, and a rotary cutter mounted in said drum for rotation in a plane transverse to said feed plane about an axis which is inclined with respect thereto, the lower feed roll of each set being mounted on a shaft carried by stationary mountings on said base, while the upper feed roll of one set is mounted through universal joints on a shaft carried by two arms mounted to pivot on said base, and the upper feed roll of the other set is carried on two additional arms mounted to pivot about said shaft, whereby said upper rolls may move vertically with respect to said lower rolls and angularly with respect to said feed plane.

9. A machine for cutting scrap lumber into small bevelled bits comprising in combination a base, a plurality of parallel sets of superposed feed rolls mounted on said base the nips of which define a feed plane along which said scraps are fed by said rolls, a drum mounted on said base athwart said plane and provided with a scrap-admitting opening in the side thereof facing said feed rolls at the level of said feed plane, and a rotary cutter mounted in said drum for rotation in a plane transverse to said feed plane about an axis which is inclined with respect thereto, the lower feed roll of each set being mounted on a shaft carried by stationary mountings on said base, while the upper feed roll of one set is mounted through universal joints on a shaft carried by two arms mounted to pivot on said base, and the upper feed roll of the other set is carried on two additional arms constituting a mobile support mounted to pivot about said shaft, whereby said upper rolls may move vertically with respect to said lower rolls and angularly with respect to said feed plane, a sleeve pivotally carried on said base and a connecting rod slidably mounted in said sleeve and pivotally connected at one end to said mobile support, said connecting rod being provided with stops on opposite sides of said sleeve and resilient means between one of said stops and said socket for cushioning the lowering of said upper roll.

10. A machine as claimed in claim 1 in which said feed means are driven through chain gearing.

References Cited in the file of this patent

UNITED STATES PATENTS

| 2,570,926 | Elmendorf | Oct. 9, 1951 |
| 2,652,077 | Alexander | Sept. 15, 1953 |
| 2,827,934 | Latimer | Mar. 25, 1958 |

FOREIGN PATENTS

| 101,625 | Sweden | May 20, 1941 |
| 146,707 | Austria | Aug. 10, 1936 |